US010155361B2

(12) United States Patent
Bookbinder et al.

(10) Patent No.: US 10,155,361 B2
(45) Date of Patent: Dec. 18, 2018

(54) METHOD OF BINDING NANOPARTICLES TO GLASS

(71) Applicants: Dana Craig Bookbinder, Corning, NY (US); Adam James Ellison, Painted Post, NY (US); Umamaheswari Janakiraman, Painted Post, NY (US); Wageesha Senaratne, Horseheads, NY (US)

(72) Inventors: Dana Craig Bookbinder, Corning, NY (US); Adam James Ellison, Painted Post, NY (US); Umamaheswari Janakiraman, Painted Post, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 13/668,537

(22) Filed: Nov. 5, 2012

(65) Prior Publication Data

US 2013/0115441 A1    May 9, 2013

Related U.S. Application Data

(60) Provisional application No. 61/557,490, filed on Nov. 9, 2011.

(51) Int. Cl.
*B32B 17/06* (2006.01)
*B05D 1/12* (2006.01)
(Continued)

(52) U.S. Cl.
CPC .............. *B32B 17/068* (2013.01); *B05D 1/08* (2013.01); *B05D 1/10* (2013.01); *B05D 1/12* (2013.01);
(Continued)

(58) Field of Classification Search
None
See application file for complete search history.

(56) References Cited

U.S. PATENT DOCUMENTS 3,804,650 A * 4/1974 Meissner ................ C04B 35/01
 106/286.5
5,717,031 A * 2/1998 Degen et al. ................. 525/129
(Continued)

FOREIGN PATENT DOCUMENTS

CN     1334588 A     2/2002
CN     1481342 A     10/2004
(Continued)

OTHER PUBLICATIONS

Sivasankar et al., "Optical Bonding Using Silica Nanoparticle Sol-Gel Chemistry", Nano Lett., 2007, 7(10), pp. 3031-3034.
(Continued)

*Primary Examiner* — Samir Shah
(74) *Attorney, Agent, or Firm* — Kevin Johnson

(57) ABSTRACT

Provided herein are nanoparticulate coated structures and methods of making structures. The structures comprise a support element, a nanoparticulate layer, and a binder disposed on the support element, wherein the binder comprises an alkali silicate or borate. In addition, methods of making the structures and uses of the described structures are described herein.

27 Claims, 6 Drawing Sheets

(51) Int. Cl.
| | |
|---|---|
| *B05D 1/08* | (2006.01) |
| *B05D 1/10* | (2006.01) |
| *B05D 1/18* | (2006.01) |
| *B05D 1/36* | (2006.01) |
| *B05D 3/02* | (2006.01) |
| *B32B 5/16* | (2006.01) |
| *C25D 9/00* | (2006.01) |
| *C03C 17/34* | (2006.01) |
| *C03C 17/42* | (2006.01) |
| *C23C 18/12* | (2006.01) |
| *B82Y 30/00* | (2011.01) |

(52) U.S. Cl.
CPC ............... *B05D 1/18* (2013.01); *B05D 1/36* (2013.01); *B05D 3/0254* (2013.01); *B32B 5/16* (2013.01); *C03C 17/3417* (2013.01); *C03C 17/42* (2013.01); *C23C 18/1212* (2013.01); *C23C 18/1225* (2013.01); *C25D 9/00* (2013.01); *B82Y 30/00* (2013.01); *C03C 2217/44* (2013.01); *C03C 2217/452* (2013.01); *C03C 2217/478* (2013.01); *C03C 2217/76* (2013.01); *C03C 2217/78* (2013.01); *Y10T 428/25* (2015.01)

(56) References Cited

U.S. PATENT DOCUMENTS

| | | | |
|---|---|---|---|
| 5,863,322 | A | 1/1999 | Van de Heisteeg et al. |
| 6,682,872 | B2 | 1/2004 | Sachdev |
| 6,800,354 | B2 | 10/2004 | Baumann et al. |
| 7,052,618 | B2 | 5/2006 | Moll |
| 2002/0037398 | A1 | 3/2002 | Tofuku et al. |
| 2002/0142150 | A1* | 10/2002 | Baumann et al. ............ 428/328 |
| 2002/0151094 | A1 | 10/2002 | Andriessen |
| 2002/0153830 | A1 | 10/2002 | Andriessen |
| 2003/0138733 | A1 | 7/2003 | Sachdev |
| 2004/0091731 | A1 | 5/2004 | Tofuku et al. |
| 2006/0145146 | A1 | 7/2006 | Suh |
| 2006/0147699 | A1 | 7/2006 | Sarkar et al. |
| 2006/0194037 | A1 | 8/2006 | Fink |
| 2008/0293872 | A1* | 11/2008 | Loth et al. .................... 524/494 |
| 2008/0305341 | A1 | 12/2008 | Plieth |
| 2009/0133748 | A1* | 5/2009 | Sharma ......................... 136/256 |
| 2009/0142568 | A1* | 6/2009 | Dejneka et al. ............. 428/220 |
| 2009/0197048 | A1 | 8/2009 | Amin et al. |
| 2010/0101649 | A1 | 4/2010 | Huignard et al. |
| 2011/0033678 | A1 | 2/2011 | Thies et al. |
| 2011/0267698 | A1 | 11/2011 | Guilfoyle et al. |

FOREIGN PATENT DOCUMENTS

| | | |
|---|---|---|
| DE | 10016485 | 10/2001 |
| EP | 1670079 | 6/2006 |
| JP | 58145642 A | 8/1983 |
| JP | 05170488 A | 7/1993 |
| JP | 2002234754 A | 8/2002 |
| JP | 2006076829 A | 3/2006 |
| JP | 2006163418 | 6/2006 |
| JP | 2007052345 | 3/2007 |
| JP | 2007070459 | 3/2007 |
| JP | 2009059666 | 3/2009 |
| JP | 2009067998 | 4/2009 |
| JP | 2009105413 | 5/2009 |
| JP | 2009223135 | 10/2009 |
| JP | 04465279 | 5/2010 |
| KR | 2006047146 | 5/2006 |
| KR | 2008047012 | 5/2008 |
| KR | 2008075495 | 8/2008 |
| KR | 2010098498 | 9/2010 |
| KR | 2010126986 | 12/2010 |
| KR | 2010130818 | 12/2010 |
| KR | 2011011194 | 2/2011 |
| WO | 0249980 A1 | 6/2002 |
| WO | 2004108846 | 12/2004 |
| WO | 2010140733 | 12/2010 |

OTHER PUBLICATIONS

Xu et al., "A Novel Trilayer Antireflection Coating Using Dip-Coating Technique", col. 9(7), 073101(2011), Chinese Optics Letters, Jul. 10, 2011.
Machine translation of JP04465279.
Machine translation of JP2006163418.
Machine translation of JP2007052345.
Machine translation of JP2007070459.
Machine translation of JP2009059666.
Machine translation of JP2009067998.
Machine translation of JP2009105413.
Machine translation of JP2009223135.
Machine translation of KR2006047146.
Machine translation of KR2008047012.
Machine translation of KR2008075495.
Machine translation of KR2010098498.
Machine translation of KR2010126986.
Machine translation of KR2010130818.
Machine translation of KR2011011194.
Machine translation of KR20087010657.
Machine translation of WO2010140733.
Patent Cooperation Treaty International Notification of Transmittal of the International Search Report and The Written Opinion of the International Searching Authority, international application No. PCT/US2012/064037: dated May 7, 2013, 10 pages.
Patent Cooperation Treaty International Notification of Transmittal of the International Preliminary Report of Patentability Report on Patentability (Chapter I of the Patent Cooperation Treaty) of the International Searching Authority, international application No. PCT/US2012/064037: dated May 22, 2014, 8 pages.
Taiwan Intellectual Property Office; English Translation of Summary of Official Letter and Search Report for Taiwan Invention Patent Application No. 101141572; dated Mar. 24, 2016; 3 pages; Taiwan.
European Patent Office; Official Letter for Application No. 12794809.9-1354; dated Apr. 20, 2016; 4 pages; Germany.
State Intellectual Property Office of the People's Republic of China; English translation of the Second Office Action for Patent Application No. 201280065834.X; May 31, 2016; 5 pages; China.
JP2014541218 Office Action dated Nov. 1, 2016, Japan Patent Office.
CN201280065834.X Office Action dated Oct. 10, 2015.
TW101141573 Search Report dated Mar. 4, 2016.

\* cited by examiner

Figure 4

| Sample ID | Dip coating conditions | | Sintering Process conditions | | Coated side CS (MPa) | Coated side DOL (μm) | Uncoated side CS (MPa) | Uncoated side DOL (μm) | Transmission (%) | Haze (%) | Oil CA (°) | Oil CA after 3000 Wipes (°) |
|---|---|---|---|---|---|---|---|---|---|---|---|---|
| | NaSil solution ID | Speed of NaSil (mm/min) | Temp (°C) | Time (h) | | | | | | | | |
| 100-120 nm Silica Particles | | | | | | | | | | | | |
| DNS 101 | 5-2 | 25 | 630 | 1 | 617 | 50 | 727 | 41 | 95.5 | 0.49 | 80.7 | |
| DNS 102 | 5-2 | 50 | 630 | 1 | 749 | 39 | 706 | 43 | | | 77.3 | |
| DNS 103 | 5-3 | 25 | 630 | 1 | 751 | 39 | 720 | 42 | 95.8 | 0.75 | 90.3 | |
| DNS 104 | 5-3 | 50 | 630 | 1 | 736 | 41 | 772 | 40 | 95.7 | 0.59 | 83.7 | |
| DNS 105 | 5-4 | 25 | 630 | 1 | 712 | 41 | 725 | 41 | 96.2 | 1.12 | 94.6 | 98.2 |
| DNS 106 | 5-4 | 50 | 630 | 1 | 744 | 41 | 705 | 42 | 96.1 | 1.11 | 91.8 | 93.5 |
| DNS 107 | 5-5 | 25 | 630 | 1 | 722 | 41 | 746 | 40 | 96.5 | 0.53 | 92.5 | 96.1 |
| DNS 108 | 5-5 | 50 | 630 | 1 | 733 | 41 | 739 | 41 | 96.5 | 0.62 | 90.3 | 102.6 |
| 250nm Silica Particles | | | | | | | | | | | | |
| DNS 201 | 5-2 | 25 | 630 | 1 | 729 | 40 | 753 | 39 | 94 | 6.24 | 94.2 | |
| DNS 202 | 5-2 | 50 | 630 | 1 | 729 | 42 | 807 | 40 | 94 | 7.14 | 83.1 | |
| DNS 203 | 5-3 | 25 | 630 | 1 | 735 | 40 | 720 | 40 | 93.3 | 8.46 | 106.8 | |
| DNS 204 | 5-3 | 50 | 630 | 1 | 708 | 42 | 715 | 41 | 93.5 | 8.27 | 104.3 | 84.2 |
| DNS 205 | 5-4 | 25 | 630 | 1 | 708 | 41 | 709 | 39 | 92.7 | 7.94 | 104.4 | 97.8 |
| DNS 206 | 5-4 | 50 | 630 | 1 | 742 | 41 | 753 | 41 | 93 | 8.47 | 103.2 | 89.3 |
| DNS 207 | 5-5 | 25 | 630 | 1 | 730 | 42 | 759 | 38 | 92.4 | 6.34 | 98.2 | 95.5 |
| DNS 208 | 5-5 | 50 | 630 | 1 | 736 | 41 | 742 | 41 | 92.3 | 7.7 | 98.8 | 93.9 |

Figure 5

| | | Na2O/SiO2 wt%/wt% | Heat treatment | CA (deg) | CA after 100 wipes (deg) | CA after 1000 wipes (deg) | CA after 3000 wipes (deg) | comment |
|---|---|---|---|---|---|---|---|---|
| LCSD4 | 100 nm | 0.4/1 | 630 C/1h | 91.5± 0.6 | | 96.8± 3.6 | 101±1.6 | passed durability test |
| LCSD7 | 100 nm | 0.08/0.2 | 630 C/1h | 105.7± 1.9 | | 97.4± 4.1 | 100.7±2.5 | passed durability test |

Figure 6

| Sample ID | Dip coating conditions | | Sintering Process conditions | |
|---|---|---|---|---|
| | NaSil solution ID | Speed of NaSil (mm/min) | Temp (°C) | Time (h) |
| DNS 254 | 5-5 | 25 | 530 | 0.5 |
| DNS 252 | 5-4 | 25 | 530 | 0.5 |

| Sample ID | Oil CA (°) | Oil CA after 1000 Wipes (°) | Oil CA after 3000 Wipes (°) | Oil CA after 5000 Wipes (°) |
|---|---|---|---|---|
| DNS 254 | 93.2 | 91.7 | 90.6 | 82.2 |
| DNS 252 | 90.6 | 95.7 | 100.9 | 99.7 |

Figure 7

| Sample ID | | Measurements after 1 Coating | | NaSil coating | | | Measurements after heat treatment | | | Pencil Scratch Test | high temp heat treatment | Pencil Scratch Test |
|---|---|---|---|---|---|---|---|---|---|---|---|---|
| | | Transmission | Haze | II Coat | Speed/ Time | Temp | Transmission | Haze | | | | |
| MP 1 | 100 nm monolayer | 96.9 | 0.34 | - | - | 300C/1hr | 97.1 | 0.32 | | | | |
| MP 2 | | 96.9 | 0.32 | 56-2 | 500(5)/5000(10) | 300C/1hr | 95.8 | 0.17 | 4h | | | |
| MP 3 | | 97 | 0.27 | 56-2 | 500(5)/5000(10) | 300C/1hr | 95.7 | 0.15 | | | | |
| MP 4 | | 96.7 | 0.37 | 56-3 | 500(5)/5000(10) | 300C/1hr | 96.3 | 0.47 | 4h | | | |
| MP 5 | | 96.9 | 0.18 | 56-3 | 500(5)/5000(10) | 300C/1hr | 96.4 | 0.21 | | | | |
| MP 6 | | 97 | 0.2 | 56-4 | 500(5)/5000(10) | 300C/1hr | 96.7 | 0.27 | b | | | |
| MP 7 | | 97 | 0.2 | 56-4 | 500(5)/5000(10) | 300C/1hr | 96.6 | 0.34 | | | | |
| MP 85 | 150 nm monolayer | 97.1 | 0.16 | 56-4 | 50mm/min | 315C/1hr | 96.7 | 0.35 | hb | 615C/1hr | hb |
| MP 86 | | 97.1 | 0.23 | 56-3 | 50mm/min | 315C/1hr | 96.2 | 0.31 | b | 615C/1hr | h |
| MP 76 | 120 nm monolayer | 97.2 | 0.07 | 56-4 | 50mm/min | 315C/1hr | 96.4 | 0.25 | h | 615C/1hr | 2h |
| MP 77 | | 97.1 | 0.07 | 56-3 | 50mm/min | 315C/1hr | 96 | 0.17 | h | 615C/1hr | 2h |

Figure 8

| | | Transmission | Haze | Dip Coat Conditions (II Coat) | Dip Coat Conditions (III Coat) | Opt Meas After 315C/1hr Transmission | Haze | Pencil Test |
|---|---|---|---|---|---|---|---|---|
| NS3 | 100 nm silica monolayer | 97.1 | 0.16 | 56-6  25mm/min | 25% T111  25mm/min | 96.6 | 0.31 | 2h |
| NS6 | | 97.1 | 0.17 | 56-4  25mm/min | 25% T111  25mm/min | 96.3 | 0.33 | 5h |
| NS25 | 130 nm silica monolayer | 97.3 | 0.15 | 56-6  25mm/min | 25% T111  50mm/min | 96.6 | 0.17 | 6h |
| NS26 | | 97.4 | 0.15 | 56-6  25mm/min | 25% T111  50mm/min | 96.6 | 0.16 | 6h |
| NS17 | 150 nm silica monolayer | 97 | 0.58 | 56-6  25mm/min | 25% T111  10mm/min | 96.9 | 0.72 | 3h |
| NS18 | | 97.1 | 0.29 | 56-6  25mm/min | 25% T111  25mm/min | 96.9 | 0.32 | 3h |
| NS19 | | 97 | 0.44 | 56-6  25mm/min | 25% T111  25mm/min | 96.8 | 0.65 | 3h |
| NS20 | | 97.1 | 0.3 | 56-4  25mm/min | 25% T111  10mm/min | 96.7 | 0.43 | 3h |
| NS21 | | 96.9 | 0.74 | 56-4  25mm/min | 25% T111  25mm/min | 96.5 | 1.29 | 8h |

METHOD OF BINDING NANOPARTICLES TO GLASS

This application claims the benefit of priority under 35 U.S.C. § 119 of U.S. Provisional Application Ser. No. 61/557,490 filed on Nov. 9, 2011 the content of which is relied upon and incorporated herein by reference in its entirety.

FIELD

The present disclosure generally relates to structures comprising stabilized particles on surfaces and methods of adhering particles. In particular, the structures, methods and processes disclosed herein relate to nanoparticles adhered to glass or glass ceramic surfaces to provide coated surfaces that have unique or improved properties. The modified glass surfaces are useful for a variety of technologies, such as photovoltaics, anti-reflection, anti-microbial, and anti-fingerprint.

BACKGROUND

Adhesion of nanoparticles to surfaces has been accomplished via a number of mechanisms, such as chemical modification of the surface or nanoparticles (as in the case of gold particles adhered via thiols) or surface modification (increased surface roughness generally leading to greater contact and adhesion). However, many of these methods suffer from continued issues of adhesion strength along with associated problems of surface irreproducibility and surfaces that are easily damaged, resulting in a lack of commercially viable products.

In the case of glass surfaces, it has been shown that it is possible to adhere nanoparticles to the glass via a thermal sintering step. In the sintering process, the glass structure was heat treated, for example at a temperature near the softening point, enabling the adhesion of nanoparticles to the surface. Typically, the nanoparticles chosen had higher $T_m$ or $T_{soft}$ than the structure glass, allowing for very good control over the amount of sintering of the nanoparticle to the structure and allowing the nanoparticles to be embedded into the glass structure up to one-half of the particle diameter or more. However, in some embodiments, the sintering temperature varied significantly as a function of the particle diameter, with larger diameter particles requiring higher temperatures. For example, a monolayer of silica 100-120 nm nanoparticles on Corning glass code 2318 required a temperature of 725-750° C. to sinter the nanoparticles to one-half the diameter into the glass surface, whereas a monolayer of 250 nm nanoparticles required a temperature of 750-770° C. Further, since the adhesion happens at a temperature higher than the anneal temperature of the glass, this results in softening of the glass which may enable deformation and warping. Therefore, there is a continued need to find new methods of adhering particles to surfaces that provides a tough surface that retains the desired chemical and physical attributes of the nanoparticle-modified surface.

SUMMARY

An aspect of the disclosure is to provide a structure comprising a support element, a binder, and a nanoparticulate layer to provide a nanotextured glass surface that has high durability and is ion exchangeable to impart mechanical strength. One embodiment comprises a structure comprising a support element, a nanoparticulate layer, and a binder, wherein the binder comprises an alkali silicate, borate, or phosphate. In some embodiments, alkali silicate comprises $SiO_2$ and $Alk_2O$, wherein Alk comprises Li, Na, or K, at a ratio from about 0.05:1 to about 20.0:1 $SiO_2$:$Alk_2O$. In some embodiments, alkali borate comprises $R(H_nAlk_2O) \cdot B_2O_3$, n=0 to <2, wherein R is about 0.05 to about 20.0 and Alk comprises Li, Na, or K, at a ratio from about 0.05:1 to about 20.0:1 $SiO_2$:$R(H_nAlk_2O) \cdot B_2O_3$. In some embodiments, the binder comprises $SiO_2$ and $H_nAlk_{3-n}PO_4$, wherein n=0 to <3 and Alk comprises Li, Na, or K, at a ratio from about 0.05:1 to about 20.0:1 $SiO_2$:$H_nAlk_{3-n}PO_4$. In some embodiments, the binder comprises $SiO_2$ at a weight percent from about 0.1 to about 40.0. In some embodiments, the thickness of the binder comprises less than about one-quarter average diameter or one-half average diameter or the average diameter of said nanoparticles.

In some embodiments, the nanoparticulate layer comprises nanoparticles comprising glass, ceramic, glass ceramic, polymer, metal, metal oxide, metal sulfide, metal selenide, metal telluride, metal phosphate, solid nanoparticles, quantum dots, inorganic composite, organic composite, inorganic/organic composite, fullerene, nanotube, nanofiber, nanowire, nanorod, nanoshell, or combinations thereof. In some embodiments, the nanoparticulate layer comprises nanoparticles comprising silica, alumina, zirconia, titania, or combinations thereof. In some embodiments, the nanoparticulate layer comprises nanoparticles having an average diameter of about 5 nm to about 10,000 nm. In some embodiments, the nanoparticulate layer comprises nanoparticles having an average diameter of about 5 nm to about 500 nm.

In some embodiments, the structure comprises a glass that has been subjected to an ion exchange process. In some embodiments, the compressive stress of the structure surface comprising the nanoparticulate layer and the binder is about equivalent to the compressive stress of the support element subjected to an ion exchange process. In some embodiments, the depth of layer of the structure surface comprising the nanoparticulate layer and the binder is about equivalent to the depth of layer of the support element subjected to an ion exchange process.

In some embodiments, the structure further comprises a capping layer. In some embodiments the capping layer comprises a chemical formulation with hydrophobic and oleophobic properties. In some embodiments, the capping layer comprises a silicate, a siloxane, a silsesquioxane, or a silane.

Another aspect is to provide methods of forming a structure comprising a support element, a binder, and a nanoparticulate layer to provide a nanotextured glass surface that has high durability and is ion exchangeable to impart mechanical strength. In one embodiment, the method comprises providing a support element, forming a nanoparticulate layer on said support element, forming a binder comprising an alkali silicate, borate or phosphate on said support element, and heating said support element comprising both said nanoparticulate layer and said binder to a temperature that allows said binder to form a glass, wherein the binder comprises an alkali silicate, borate or phosphate. In some embodiments, alkali silicate comprises $SiO_2$ and $Alk_2O$, wherein Alk comprises Li, Na, or K, at a ratio from about 0.05:1 to about 20.0:1 $SiO_2$:$Alk_2O$. In some embodiments, alkali borate comprises $R(H_nAlk_2O) \cdot B_2O_3$, n=0 to <2, wherein R is about 0.05 to about 20.0 and Alk comprises Li, Na, or K, at a ratio from about 0.05:1 to about 20.0:1 $SiO_2$:$R(H_nAlk_2O) \cdot B_2O_3$, n=0 to <2. In some embodiments, the binder comprises $SiO_2$ and $Alk_3PO_4$, wherein Alk comprises Li, Na, or K, at a ratio from about 0.05:1 to about 20.0:1 $SiO_2$:$H_n Alk_{3-n} PO_4$, n=0 to <3. In some embodiments, the binder comprises $SiO_2$ or $B_2O_3$ at a weight percent from about 0.1 to about 40.0. In some embodiments, the thickness of the binder comprises less than about one-quarter average diameter or one-half average diameter or the average diameter of said nanoparticles. In some embodiments, the method further comprises subjecting the structure to an ion exchange process.

In some embodiments, forming the binder comprises dip coating, spin coating, Langmuir-Blodgett deposition, slot coating, electrospray ionization, direct nanoparticle deposition, vapor deposition, chemical deposition, vacuum filtration, flame spray, electrospray, spray deposition, electro deposition, screen printing, close space sublimation, nano-imprint lithography, in situ growth, microwave assisted chemical vapor deposition, laser ablation, arc discharge or chemical etching.

In some embodiments, forming the nanoparticulate layer comprises dip coating, spin coating, slot coating, Langmuir-Blodgett deposition, electrospray ionization, direct nanoparticle deposition, vapor deposition, chemical deposition, vacuum filtration, flame spray, electrospray, spray deposition, electrodeposition, screen printing, close space sublimation, nano-imprint lithography, in situ growth, microwave assisted chemical vapor deposition, laser ablation, arc discharge or chemical etching. In some embodiments, the nanoparticulate layer comprises nanoparticles comprising glass, ceramic, glass ceramic, polymer, metal, metal oxide, metal sulfide, metal selenide, metal telluride, metal phosphate, solid nanoparticles, quantum dots, inorganic composite, organic composite, inorganic/organic composite, fullerene, nanotube, nanofiber, nanowire, nanorod, nanoshell, or combinations thereof. In some embodiments, the nanoparticulate layer comprises nanoparticles comprising silica, alumina, zirconia, titania, or combinations thereof. In some embodiments, the nanoparticulate layer comprises nanoparticles having an average diameter of about 5 nm to about 10,000 nm. In some embodiments, the nanoparticulate layer comprises a monolayer or multilayer with a thickness from about 5 nm to about 10,000 nm. In some embodiments, the nanoparticulate layer comprises nanoparticles having an average diameter of about 5 nm to about 500 nm.

Embodiments are useful in, for example, anti-fingerprint, anti-microbial, spectroscopic, and anti-glare technologies as they provide a durable structure that is able to withstand commercial use and/or have good reproducibility. Further, structures may also provide an advantage in cases where the coefficient of thermal expansion (CTE) mismatch between the support element and nanoparticle layer may result in deformation or adhesion problems when the nanoparticles and support element are bonded together. In such cases, the use of a binder with a CTE that more closely matches the CTE of the support element can minimize these problems.

BRIEF DESCRIPTION OF THE DRAWINGS

FIG. 1A shows a thicker coating of the inorganic binder wherein the solution was 1% $SiO_2$ and 0.4% $Na_2O$ by weight (LCSD4) and FIG. 1B shows a thinner coating of the inorganic binder wherein the solution was 0.2% $SiO_2$ and 0.08% $Na_2O$ by weight (LCSD7). In both experiments, the structures were heat treated at 630° C. for 1 hour. Testing by Crockmeter (AATCC Crockmeter CM-5, SDL-Atlas) showed good coating durability for both structures after both 1000 and 3000 wipes with microfiber cloth (382ZZ-100, Photodon.com).

In FIG. 2A, the mark on the nanoparticle and binder coated structure was made by a graphite pencil with a hardness of 3B. As can be seen in FIG. 2A, the pencil transferred graphite to the surface, but no scratch or damage is evident in the nanoparticulate layer in FIG. 2B.

FIG. 4 shows that both 100 nm and 250 nm particles tested with sodium silicate (NaSil) coatings (formulations 5-4 and 5-5 at two speeds of dip coating) with a capping layer held up to testing when subjected to 3000 wipes durability measured by contact angle before and after the crockmeter swiping tests.

FIG. 5 shows data corresponding to FIGS. 1A and 1B.

FIG. 6 compares two different embodiments comprising 100 nm particles tested with a NaSil coating.

FIG. 7 lists the % Haze and Transmittance obtained for a variety of different diameter nanoparticle/binder coatings in combination with fro the HAZE-GARD PLUS® coating (BYK Additives and Instruments, Inc.).

FIG. 8 describes the properties of a number of different embodiments comprising various size silica nanoparticle layers and multiple coatings.

DETAILED DESCRIPTION

Figure 1B:
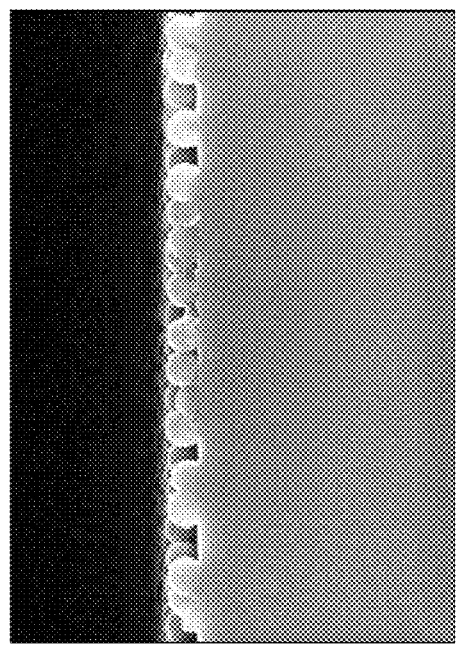
FIGS. 1A and 1B: SEM images of 100 nm silica nanoparticles as a monolayer on a silica surface followed by two different concentrations of coatings of the inorganic binder ($SiO_2/Na_2O$, wt. % ratio 2.5:1).

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made to the various aspects of the disclosure described herein, while still obtaining the beneficial results of the present embodiments. It will also be apparent that some of the desired benefits can be obtained by selecting some of the features disclosed herein without utilizing other features. Accordingly, those who work in the art will recognize that many modifications and adaptations are possible and can even be desirable in certain circumstances and are a part of the present disclosure. Thus, the following description is provided as illustrative of the principles and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Definitions

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "support element" refers to a solid layer used to support the nanoparticulate layer, and the binder and may generally comprise any material with sufficient mechanical properties to support the binder and the nanoparticulate layer.

The term "nanoparticulate layer" refers to a material coating with features on the scale of about 1 nm to about 10,000 nm. In some embodiments, the nanoparticulate layer refers to a material coating having a feature having at least one dimension that is from about 5 nm to about 500 nm. In some embodiments, the nanoparticulate layer refers to a material coating having a feature having an average diameter of from about 5 nm to about 500 nm. The features, as described herein, may comprise modifications to the surface comprising individual particles, for example nanoparticles, combinations of particles, or be modfications on larger objects. The nanoparticulate layer may comprise less than a monolayer, a monolayer, or multiple layers of individual particles or features.

The term "nanoparticle" refers to a particle/component with an average diameter along the shortest axis of between about 1 and about 10,000 nm. Nanoparticles further comprise other nanoscale compositions, such as nanoclusters, nanopowders, nanocrystals, solid nanoparticles, nanotubes, quantum dots, nanofibers, nanowires, nanorods, nanoshells, fullerenes, and large-scale molecular components, such as polymers and dendrimers, and combinations thereof. Nanoparticles may comprise any material compatible with the embodiments, such as, but not limited to metal, glass, ceramic, inorganic or metal oxide, polymer, or organic molecules or combination thereof. In some embodiments, the nanoparticles comprise silica, alumina, zirconia, titania, or combinations thereof.

The term "binder" refers to a material that may be used, at least in part, to bond the nanoparticulate layer to the support element. The binder comprises an alkali silicate borate, or phosphate, and may further comprise any material compatible with bonding the nanoparticulate layer to the support element in the embodiment in which it is used. For example, the binder may further comprise a surfactant to improve coating properties. The nanoparticulate layer may be chemically, mechanically, or physically bonded to and/or embedded in the binder. In some embodiments, the nanoparticulate layer may be embedded in the binder and further embedded in and/or bonded to the support element.

The term "embed" or "embedded" refers to the inclusion of the individual components of the nanoparticulate layer into either the binder and/or the support element and may comprise chemically, mechanically, or physically bonding the nanoparticulate layer to the binder and/or support element. In being embedded, the components of the nanoparticulate layer retain their individual structure and are not mixed, dissolved, or otherwise dispersed into the binder and/or support element.

The term "alkali silicate" comprises compounds of general structure $X(SiO_2).(Alk_nO_m)$, wherein Alk is an alkali metal, n is from 1 to 4, m is from 1 to 7, and X comprises from about 0.05 to about 20.0. The term alkali silicate comprises water glasses and soluble glasses. Examples of alkali silicates include orthosilicate ($Alk_4SiO_4$), metasilicate ($Alk_2SiO_3$), disilicate ($Alk_2Si_2O_5$), and tetrasilicate ($Alk_2Si_4O_9$).

The term "alkali borate" comprises compounds of general structure $X(Alk_2O).B_2O_3$, wherein Alk is an alkali metal and X comprises from about 0.05 to about 20.0. One procedure for making alkali borates is described in Banerjee et al., *Structural Studies of Solution-Made High Alkali Content Borate Glasses*, 352 J. NON-CRYSTALLINE SOLIDS, 674-678 (2006) (hereby incorporated by reference in its entirety).

The term "alkali phosphate" comprises compounds of the general structure $H_nAlk_{3-n}PO_4$, wherein Alk is an alkali metal.

In one aspect, embodiments comprise durable nanoengineered surfaces that are ion exchangeable and use an alkali silicate/borate/phosphate type of binder. It has been shown that the use of nanoparticle-coated surfaces is beneficial for obtaining surfaces with low percent total reflection (≤1% from 450-650 nm) as an anti-reflection coating or, as an anti-fingerprint surface when modified with a perfluoropolyethersilane (e.g., Dow Corning DC2634) or fluoro alkylsilane (e.g., heptadecafluoro-1,1,2,2-tetrahydrodecyl) trimethoxysilane ($C_8F_{17}(CH_2)_2Si(OMe)_3$), Gelest) or hydrocarbonsilane (e.g. octadecyltrimethoxysilane, Gelest) coatings that are oleophobic (oil static contact angle >90°) superoleophobic (>150°), and hydrophobic (water static contact angle >90°) or superhydrophobic (>150°). The term oleophobic refers to a surface having an oleic acid static contact angle 90° room temperature (22-25° C.). The term hydrophobic refers to surface having a water static contact angle 90° at room temperature (22-25° C.). In some embodiments, the contact angle is measured using a goniometer (e.g., Drop Shape Analyzer DSA100, Kruss GmbH, Germany) Other applications where it may be advantageous to use nanoparticles include photovoltaic surfaces, anti-microbial coatings and catalyst applications. The present embodiments augment the ability to use these unique surface properties in many novel applications by producing a structure that is significantly more durable and additionally, is ion exchangeable, allowing for surface strengthening procedures to be done subsequent to structure formation.

In one embodiment, the structure comprises a support element, a nanoparticulate layer, and a binder, wherein the binder comprises an alkali silicate, borate, or phosphate. The support element may generally comprise any material with sufficient mechanical properties to support the binder and the nanoparticulate layer. Examples of possible materials for the support element include, but are not limited to, glass, glass ceramic, inorganic or metal oxide, metal, polymer, paper, wood, and graphite. In some embodiments, the support element comprises a glass, glass ceramic, ceramic, or inorganic oxide. The support element may generally be of a size and shape that would make it practical for commercial or laboratory use, but may comprise any size or shape.

In some embodiments, the binder comprises at least one inorganic oxide, such as, SiO or $SiO_2$. In some embodiments, the binder comprises a water glass, silicon alkoxide, or a silsesquioxane (SSQ). As used herein, the term "silsesquioxane" refers to compounds having the empirical chemical formula $RSiO_{1.5}$, where R is either hydrogen or an alkyl, alkene, aryl, or arylene group.

In some embodiments, the binder comprises an alkali silicate, borate, or phosphate. In some embodiments, the binder comprises an alkali silicate. In some embodiments, the alkali silicate comprises $SiO_2$ and $Alk_2O$, wherein Alk comprises Li, Na, or K, at a ratio from about 0.05:1 to about 20.0:1. In some embodiments, the binder comprises $SiO_2$ and $Alk_2O$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$Alk_2O$. In some embodiments, the alkali silicate binder comprises $SiO_2$ at a weight percent from about 0.1 to about 40.0. In some embodiments, the alkali silicate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, the binder comprises alkali borate. In some embodiments, the binder comprises $SiO_2$ and $X(H_nAlk_{2-n}O).B_2O_3$ where n<2, wherein X is about 0.05 to about 20.0 and Alk comprises Li, Na, or K. In some embodiments, the binder comprises $SiO_2$ and $X(H_nAlk_{2-n}O).B_2O_3$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$X(H_nAlk_{2-n}O).B_2O_3$. In some embodiments, the alkali borate binder comprises $SiO_2$ at a weight percent from about 0.1 to about 40.0. In some embodiments, the alkali borate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, the binder comprises alkali phosphate. In some embodiments, the binder comprises $SiO_2$ and $H_nAlk_{3-n}PO_4$, wherein n<3, and wherein Alk comprises Li, Na, or K. In some embodiments, the binder comprises $SiO_2$ and $H_nAlk_{3-n}PO_4$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$H_nAlk_{3-n}PO_4$. In some embodiments, the alkali phosphate binder comprises $SiO_2$ at a weight percent from about 0.1 to about 40.0. In some embodiments, the alkali phosphate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, the binder is heat-treated at a temperature where the water is completely removed from the composition enabling the consolidation of the network structure to form a glass. In some embodiments, the binder us heat treated at a temperature from about 500 to about 700° C. and, in some embodiments, heat-treating comprises heating to about 300° C., 350° C., 400° C., 450° C., 500° C., 550° C., 600° C., 650° C., 700° C. or 750° C. In some embodiments, the binder is heat-treated at a temperature from about 530° C. to about 630° C., wherein the alkali silicate or alkali borate or phosphate is converted to a network structure. In some embodiments, the binder is heat-treated at a temperature from about 400° C. to about 750° C., wherein the alkali silicate or alkali borate or phosphate is converted to a network structure. In another embodiment, the binder is heated or annealed at a temperature of at least about 300° C., wherein the alkali silicate or alkali borate is converted to a glass with no affect on the nanoparticulate layer.

In some embodiments, the binder is applied by dip coating, spin coating, slot coating, Langmuir-Blodgett deposition, electrospray ionization, direct nanoparticle deposition, vapor deposition, chemical deposition, vacuum filtration, flame spray, electrospray, spray deposition, electro deposition, screen printing, close space sublimation, nanoimprint lithography, in situ growth, microwave assisted chemical vapor deposition, laser ablation, arc discharge, gravure printing, doctor blading, spray-coating, slot die coating, or chemical etching. In some embodiments, the binder is applied by spin-coating, dip-coating, Langmuir-Blodgett deposition, gravure printing, doctor blading, spray-coating, or slot die coating. In some embodiments, the thickness of the binder comprises a function of the coating speed. In some embodiments, the thickness comprises a function of the concentration of the binder. In some embodiments, the binder further comprises a polymer, a glass, a sol gel, a resin, a ceramic, a glass ceramic, an inorganic or organic oxide, a water glass, a metal or a metal oxide. In some embodiments, the binder further comprises nanoparticles.

In some embodiments, the binder has a thickness of from about 1 nm to about 10 μm, or about 1 nm, 2 nm, 3 nm, 5 nm, 10 nm, 15 nm, 20 nm, 25 nm, 30 nm, 40 nm, 50 nm, 75 nm, 100 nm, 125 nm, 150 nm, 175 nm, 200 nm, 250 nm, 300 nm, 350 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the binder has a thickness that is on the order of the size of the particles in the nanoparticulate layer.

In some embodiments, the structure may comprise multiple binders, with nanoparticulate layers optionally formed between each binder.

In some embodiments the nanoparticulate layer comprises microparticles, or nanoparticles comprising solid nanoparticles, nanotubes, quantum dots, nanofibers, nanowires, nanorods, nanoshells, fullerenes, nanoclusters, nanopowders, nanocrystals, solid nanoparticles, nanotubes, quantum dots, nanofibers, nanowires, nanorods, nanoshells, fullerenes, and large-scale molecular components, such as polymers and dendrimers, or combinations thereof. In some embodiments, the nanoparticulate layer comprises a glass, ceramic, glass ceramic, polymer, a semiconductor, a metal, a metal oxide, a mixed metal oxide, metal salt, metal sulfide, metal selenide, metal telluride, metal phosphate, inorganic nanoparticles, organic nanoparticles, an inorganic oxide, graphite, fullerene, or nanotubes, and combinations thereof. In some embodiments, the nanoparticulate layer comprises nanoparticles comprising sapphire, silicon carbide, silica, alumina, zirconia, titania, glass frit, silica glass, soda lime glass, single or multi-element oxide, such as $Al_2O_3$, $Bi_2O_3$, $Co_3O_4$, $CoFe_2O_4$, $MnFe_2O_4$, or $BaFe_{12}O_{19}$, or compounds, such as AlN, BN, $LaF_3$, SiC, $Si_3N_4$, or TiC. The composition of the nanoparticulate layer can vary and it is not required that all particles in the nanoparticulate layer comprise the same composition.

Nanoparticles may comprise any material compatible with the embodiments disclosed. In some embodiments, nanoparticles comprise glass, ceramic, glass ceramic, polymer, a semiconductor, a metal, a metal oxide, a mixed metal oxide, metal salt, metal sulfide, metal selenide, metal telluride, metal phosphate, inorganic nanoparticles, organic nanoparticles, an inorganic oxide, graphite, fullerene, or nanotubes, and combinations thereof. In some embodiments, nanoparticles comprise metal, metal oxide, glass, ceramic, or inorganic oxide. In some embodiments, the nanoparticles comprise sapphire, silicon carbide, silica, alumina, zirconia, titania, glass frit, silica glass, soda lime glass, single or multi-element oxide, such as $Al_2O_3$, $Bi_2O_3$, $Co_3O_4$, $CoFe_2O_4$, $MnFe_2O_4$, or $BaFe_{12}O_{19}$, or compounds, such as AlN, BN, $LaF_3$, SiC, $Si_3N_4$, or TiC. The composition of any one or more nanoparticles can vary and it is not required that all nanoparticles comprise the same composition. Nanoparticles may have any shape and surface features. The structure and geometry of a nanoparticle can vary and the disclosure is not intended to be limited to any particular geometry and/or structure. Embodiments comprise a plurality of nanoparticles and each individual nanoparticle or group of nanoparticles can have either the same or different structure and/or geometry than other nanoparticles. For example, in some embodiments, nanoparticles may be spherical, oblong, polyhedral, flakes, or take on crystalline-type structures. In some embodiments nanoparticle surfaces may be smooth, rough, ordered, disordered, or patterned.

Examples of nanoparticles that may be used in embodiments, include, but are not limited to, commercially available silica nanoparticles range from 10-200 nm colloidal silica dispersions in isopropanol (Organosilicasol, Nissan Chemical, USA), 10-200 nm colloidal silica dispersions in water (SNOWTEX®, Nissan Chemical, USA), 100-500 nm colloidal silica dispersions in water (Corpuscular Inc.), alumina dispersions (DISPERAL®, DISPAL®, Sasol Germany GmbH and AERODISP®, Evonik Degussa, USA), Zirconia dispersions (NanoUse ZR, Nissan Chemical, USA), and titania dispersions (AERODISP®, VP Disp., Evonik Degussa, USA).

It should be understood that particle sizes of nanoparticles can be distributional properties. Further, in some embodiments, the nanoparticles may have different sizes or distributions or more than one size or distribution. Thus, a particular size can refer to an average particle diameter or radius which relates to the distribution of individual particle sizes. In some embodiments, the size of the nanoparticles used is dependent on the wavelength of the excitation source. In some embodiments, the size of the nanoparticles is dependent on the analyte. In some embodiments, the nanoparticles of the nanoparticulate layer have an average diameter from about 5 nm to about 10000 nm, from about 5 nm to about 7500 nm, from about 5 nm to about 5000 nm, from about 5 nm to about 2500 nm, from about 5 to about 2000, from about 5 to about 1500, from about 5 to about 1250, 5 nm to about 1000 nm, from about 5 nm to about 750 nm, from about 5 nm to about 500 nm, from about 5 nm to about 250 nm, from about 5 to about 200, from about 5 to about 150, from about 5 to about 125, from about 5 to about 100, from about 5 to about 75, from about 5 to about 50, from about 5 to about 25, from about 5 to about 20, from about 10 nm to about 1000 nm, from about 10 nm to about 750 nm, from about 10 nm to about 500 nm, from about 10 nm to about 250 nm, from about 10 to about 200, from about 10 to about 150, from about 10 to about 125, from about 10 to about 100, from about 10 to about 75, from about 10 to about 50, from about 10 to about 25, from about 10 to about 20, from about 20 nm to about 1000 nm, from about 20 nm to about 750 nm, from about 20 nm to about 500 nm, from about 20 nm to about 250 nm, from about 20 to about 200, from about 20 to about 150, from about 20 to about 125, from about 20 to about 100, from about 20 to about 75, from about 20 to about 50, from about 20 to about 25, from about 50 nm to about 1000 nm, from about 50 nm to about 750 nm, from about 50 nm to about 500 nm, from about 50 nm to about 250 nm, from about 50 to about 200, from about 50 to about 150, from about 50 to about 125, from about 50 to about 100, from about 50 to about 75, from about 100 nm to about 1000 nm, from about 100 nm to about 750 nm, from about 100 nm to about 500 nm, from about 100 nm to about 250 nm, from about 100 to about 200, from about 100 to about 150, or about 5 nm, 10 nm, 20 nm, 25 nm, 50 nm, 75 nm, 100 nm, 125 nm, 150 nm, 175 nm, 200 nm, 250 nm, 300 nm, 400 nm, 500 nm, 600 nm, 700 nm, 750 nm, 800 nm, 900 nm, 1000 nm, 1250 nm, 1500 nm, 2000 nm, 2500 nm, 5000 nm, 7500 nm, or 10,000 nm.

In some embodiments, the roughness of the nanoparticulate layer is controlled via nanoparticle morphology, size, packing pattern, and height. In some embodiments, the morphology of the nanoparticulate layer is integral to the desired properties of the structure. In some embodiments, the morphology comprises the surface roughness of the nanoparticulate layer. In some embodiments, surface roughness is described by the arithmetic average of absolute values of surface height, $R_a$. In some embodiments, surface roughness may be described by the root mean square of the surface height values, $R_q$. In some embodiments, surface roughness comprises the nanoparticle interstitial space, the curved regions created by multiple particles situated within close proximity to each other. In some embodiments, surface roughness comprises the interstitial space of the nanoparticles. In some embodiments, close proximity comprises within about 100, 75, 50, 25, 20, 15, 10, 8, 7, 6, 5, 4, 3, 2.5, 2, 1.5, 1, 0.75, 0.5, 0.25, or 0 radii of the average nanoparticle size along the shortest dimension.

The nanoparticulate layer may comprise any structural formation. In some embodiments, the nanoparticulate layer comprises from about a monolayer to multilayer of nanoparticles. In some embodiments, the nanoparticulate layer comprises about a monolayer of nanoparticles. In some embodiments, the nanoparticulate layer comprises multiple layers of nanoparticles. In some embodiments, the nanoparticulate layer is ordered, disordered, random, packed, for example close packed, or arranged, for example via surface modification. In some embodiments, the nanoparticulate layer comprises nanoparticles that are clustered, agglomerated or ordered into isolated groups. Generally, dense or close packing will provide more nanostructured sites per unit surface area than non-dense packing The limits of the packing density are influenced by the particle size. In some embodiments, useful average peak-to-peak distances (measured from apex to apex of adjacent nanoparticles) range from about 15 nm to 15,000 nm for nanoparticle sizes ranging from about 10 nm to about 10,000 nm. In some embodiments, average peak-to-peak distances comprise about 15, 30, 50, 75, 100, 150, 200, 250, 300, 350, 400, 450, 500, 600, 700, 800, 900, or 1000 nm with particle sizes of about 15, 30, 50, 75, 100, 150, 200, 250, 300, 350, 400, 450, 500, 600, 700, 800, 900, or 1000 nm. In some embodiments, average peak to peak distances comprise about 100, 75, 50, 25, 20, 15, 10, 8, 7, 6, 5, 4, 3, 2.5, or 2 radii of the average nanoparticle size along the shortest dimension.

Embodiments comprise a nanoparticulate layer bonded to the binder. In one embodiment, bonding occurs via a thermal mechanism, such as heating of the binder and/or support element. In some embodiments, bonding comprises embedding the nanoparticulate in the binder. In other embodiments, bonding comprises coating the nanoparticulate layer with the binder.

In some embodiments, nanoparticles are partially embedded in the binder and/or support element so as to secure, bond, or adhere the nanoparticles to support element. Alternatively, in some embodiments the step of bonding the nanoparticulate layer to the support element comprises partially filling spaces between the particles with a binder.

In some embodiments, a majority of the particles in the nanoparticulate layer has a portion of its volume above the surface of the binder and/or support element it is disposed on. In some embodiments the portion is less than ¾ of the volume of the particle. In one embodiment, the portion is less than ⅔ of the volume of the particle, for example, less than ½, for example, less than ⅓. In some embodiments, the nanoparticulate layer is embedded in the immobilization layer to a depth less than about half (i.e., less than about 50%) of the diameter or major dimension of the nanoparticulate layer. In other embodiments, the depth is less than about three eighths (i.e., less than about 37.5%) of the diameter of the nanoparticulate layer. In still other embodiments, the depth is less than about one fourth (i.e., less than about 25%) of diameter of the nanoparticulate layer.

Optionally, the structure further comprises a capping layer. The capping layer comprises a component that will be added onto the binder and nanoparticle structure a protective coating to environmental effects. In some embodiments the capping layer comprises an alkali silicate, such as $SiO_2$ and $Alk_2O$, wherein Alk comprises Li, Na, or K, at a ratio from about 0.05:1 to about 20.0:1 $SiO_2$:$Alk_2O$, a perfluoropolyethersilane (e.g., Dow Corning® DC2634), fluoroalkylsilane (e.g., heptadecafluoro-1,1,2,2-tetrahydrodecyl), trimethoxysilane (e.g., $C_8F_{17}(CH_2)_2$ $Si(OMe)_3$), or hydrocarbonsilanes (e.g., octadecyltrimethoxysilane) that will react covalently with the nanoparticles and/or the binder structure. In some embodiments, the capping layer comprises a hybrid binder, such as a siloxane or a silsesquioxane (SSQ). As used herein siloxane is $R_2SiO$, where R comprises an alkyl, alkene, aryl, or arylene group. As used herein, the term "silsesquioxane" refers to compounds having the empirical chemical formula $RSiO_{1.5}$, where R comprises either hydrogen or an alkyl, alkene, aryl, or arylene group.

In some embodiments, the structure comprises a glass that has been subjected to an ion exchange process. Processes for ion exchanging glass can be found in, for example, U.S. Pat. No. 3,630,704, hereby incorporated by reference in its entirety. In some embodiments, the compressive stress of the structure surface comprising the nanoparticulate layer and the binder is about equivalent to the compressive stress of the support element subjected to an ion exchange process. In some embodiments, the depth of layer of the structure surface comprising the nanoparticulate layer and the binder is about equivalent to the depth of layer of the support element subjected to an ion exchange process.

A second aspect is to provide methods of forming the embodied structures. One embodiment comprises a method of forming a structure comprising a) providing a support element; b) forming a nanoparticulate layer on said support element; c) forming a binder comprising an alkali silicate or borate on said support element; and d) heating said support element comprising both said nanoparticulate layer and said binder to a temperature that allows said binder to form a glass. In some embodiments, the binder comprises an alkali silicate, borate or phosphate. In some embodiments, the alkali silicate comprises $SiO_2$ and $Alk_2O$, wherein Alk comprises Li, Na, or K, at a ratio from about 0.05:1 to about 20.0:1. In some embodiments, the binder comprises $SiO_2$ and $Alk_2O$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$Alk_2O$. In some embodiments, the alkali silicate binder comprises $SiO_2$ at a weight percent from about 0.1 to about 40.0. In some embodiments, the alkali silicate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, the binder comprises alkali borate. In some embodiments, the binder comprises $SiO_2$ and $X(H_nAlk_{2-n}O).B_2O_3$, wherein n<2, X is about 0.05 to about 20.0, and Alk comprises Li, Na, or K. In some embodiments, the binder comprises $SiO_2$ and $X(H_nAlk_{2-n}O).B_2O_3$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$X(H_nAlk_{2-n}O).B_2O_3$. In some embodiments, the alkali borate binder comprises $SiO_2$ at a weight percent from about 0.1 to about 40.0. In some embodiments, the alkali borate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, the binder comprises alkali phosphate. In some embodiments, the binder comprises $SiO_2$ and $H_nAlk_{3-n}PO_4$, wherein n<3 and Alk comprises Li, Na, or K. In some embodiments, the binder comprises $SiO_2$ and $HnAlk_{3-n}PO_4$, wherein Alk comprises Li, Na, or K, at a ratio of about 0.05, 0.1, 0.2, 0.3, 0.4, 0.5, 0.7, 1.0, 1.5, 1.7, 1.9, 2.0, 2.2, 2.5, 2.8, 3.0, 3.5, 4.0, 5.0, 7.0, 10.0, 13.0, 15.0, 17.0, or 20.0 $SiO_2$:$HnAlk_{3-n}PO_4$. In some embodiments, the alkali phosphate binder comprises $SiO_2$ at a weight percent from about 0.1 to about 40.0. In some embodiments, the alkali phosphate binder comprises $SiO_2$ at a weight percent of about 0.1, 0.2, 0.3, 0.4, 0.5, 0.6, 0.7, 0.8, 0.9, 1.0, 2.0, 2.5, 3.0, 3.5, 4.0, 4.5, 5.0, 6.0, 7.0, 8.0, 9.0, 10.0, 12, 14, 16, 18, 20, 25, 30, 35, or 40.

In some embodiments, forming an binder comprises dip coating, spin coating, slot coating, Langmuir-Blodgett deposition, electrospray ionization, direct nanoparticle deposition, vapor deposition, chemical deposition, vacuum filtration, flame spray, electrospray, spray deposition, electro deposition, screen printing, close space sublimation, nanoimprint lithography, in situ growth, microwave assisted chemical vapor deposition, laser ablation, arc discharge, gravure printing, doctor blading, spray-coating, slot die coating, or chemical etching. In some embodiments, the thickness of the coating comprises a function of the coating speed. In some embodiments, the thickness comprises a function of the concentration of the binder.

In some embodiments, the nanoparticulate layer is embedded the binder. In some embodiments, the binder formation step occurs before the nanoparticulate layer formation step. In some embodiments, the nanoparticulate layer formation step occurs before the binder formation step.

In some embodiments, the formation of the nanoparticulate layer comprises dip coating, spin coating, slot coating, Langmuir-Blodgett deposition, electrospray ionization, direct nanoparticle deposition, vapor deposition, chemical deposition, vacuum filtration, flame spray, electrospray, spray deposition, electrodeposition, screen printing, close space sublimation, nano-imprint lithography, in situ growth, microwave assisted chemical vapor deposition, laser ablation, arc discharge or chemical etching. In some embodiments, the thickness of the coating comprises a function of the coating speed. In some embodiments, the thickness comprises a function of the concentration of the nanoparticulate layer.

In one embodiment, the nanoparticulate layer may be formed by using a self-assembly process, by soot deposition, or using an adhesive formed monolayer. A self-assembly method can be, for example, functionalizing particles with a silane, spreading the functionalized particles on water to form a monolayer, and putting the structure through the monolayer to deposit the particles onto the structure; or by other self-assembly methods known in the art. A soot deposition method can be, for example, passing reactants through, for example, a burner to produce soot particles and depositing the soot particles onto the structure; or by other soot deposition methods known in the art. An adhesive monolayer forming method can be, for example, applying an adhesive to a structure, applying particles to the adhesive coated structure, and removing the excess particles to form a monolayer of particles on the structure; or by other adhesive monolayer forming methods known in the art. The process is not specific to a type of structure glass. In some embodiments, the structure may be heated in a furnace above its softening point with a weight on top of the sample and subsequently cooled.

In one embodiment, the nanoparticulate layer is formed by dip-coating. In one embodiment, the dip coating is done with a suspension or a dispersion comprising a liquid carrier and nanoparticles. The liquid carrier can generally be chosen with properties such that it will not accumulate on the subphase. Properties that may be relevant to the ability of the liquid carrier to not accumulate on the subphase liquid include, but are not limited to, the miscibility of the liquid carrier with the subphase, and the vapor pressure of the liquid carrier. In one embodiment, the liquid carrier can be chosen to be miscible or at least partially miscible in the subphase. In one embodiment, the liquid carrier can be chosen to have a relatively high vapor pressure. The liquid carrier can also be chosen as one that can easily be recovered from the subphase. The liquid carrier can also be chosen as one that is not considered environmentally or occupationally hazardous or undesirable. In another embodiment, the liquid carrier can be chosen based on one of, more than one of, or even all of the above noted properties. In some instances, properties other than those discussed herein may also be relevant to the choice of liquid carrier.

In an embodiment, the liquid carrier can be, for example, a single solvent, a mixture of solvents, or a solvent (a single solvent or a mixture of solvents) having other non-solvent components. Exemplary solvents that can be utilized include, but are not limited to, a hydrocarbon, a halogenated hydrocarbon, an alcohol, an ether, a ketone, and like substances, or mixtures thereof, such as 2-propanol (also referred to as isopropanol, IPA, or isopropyl alcohol), tetrahydrofuran (THF), ethanol, chloroform, acetone, butanol, octanol, pentane, hexane, cyclohexane, and mixtures thereof. In an embodiment where the subphase is a polar liquid (such as water), exemplary liquid carriers that can be utilized include, but are not limited to, 2-propanol, tetrahydrofuan, and ethanol for example. Non-solvent components that can be added to a solvent to form the liquid carrier include, but are not limited to, dispersants, salts, and viscosity modifiers. According to one embodiment, the liquid subphase comprises a material selected from water, heavy water ($D_2O$), an aqueous salt solution, or combinations thereof.

Optionally, the structure further comprises a capping layer. The capping layer comprises a component that will be added onto the binder and nanoparticle structure a protective coating to environmental effects. In some embodiments the capping layer comprises an alkali silicate, such as $SiO_2$ and $Alk_2O$, wherein Alk comprises Li, Na, or K, at a ratio from about 0.05:1 to about 20.0:1 $SiO_2$:$Alk_2O$, a perfluoropolyethersilane (e.g., Dow Corning® DC2634), fluoroalkylsilane (e.g., heptadecafluoro-1,1,2,2-tetrahydrodecyl), trimethoxysilane (e.g., $C_8F_{17}(CH_2)_2$ Si(OMe)$_3$),or hydrocarbonsilanes (e.g., octadecyltrimethoxysilane) that will react covalently with the nanoparticles and/or the binder structure. In some embodiments, the capping layer comprises a hybrid binder, such as a siloxane or a SSQ.

In some embodiments, the structure is further subjected to an ion exchange process. In some embodiments, the structure comprises a glass that has been subjected to an ion exchange process. Processes for ion exchanging glass can be found in, for example, U.S. Pat. No. 3,630,730, hereby incorporated by reference in its entirety.

EXAMPLES

Example 1

Binder Compositions

Soluble silicates are water soluble glasses generally manufactured from varied proportions of an alkali metal and $SiO_2$. Shown in Tables 1 and 2 are sodium silicates ("NaSil") where the $SiO_2$:$Na_2O$ ratios are varied from 2.00 to 3.22 (PQ corporation, Sigma-Aldrich). NaSil with ratio $SiO_2$/$Na_2O$~2.5 and higher have shown good performance with the nanoparticle adhesion. Sodium silicate (5-x series) with $SiO_2$% of 26.5% and a ratio of $SiO_2$/$Na_2O$ of 2.5 is from Sigma Aldrich and sodium silicate E (56-x series) with $SiO_2$% of 27.2% and a ratio of $SiO_2$/$Na_2O$ 3.2 is from PQ. Different NaSils are diluted to different concentrations while ensuring a consistent and stable pH (11-12) and used in the coating methods.

TABLE 1

| NaSil ID | $Na_2O$ (wt %)/ $SiO_2$ (wt %) |
|---|---|
| 5-2 | 1.1/2.6 |
| 5-3 | 0.53/1.3 |
| 5-4 | 0.26/0.66 |
| 5-5 | 0.08/0.2 |

TABLE 2

| NaSil ID | Na$_2$O (wt %)/ SiO$_2$ (wt %) |
|---|---|
| 56-1 | 1.65/5.3 |
| 56-2 | 0.82/2.65 |
| 56-3 | 0.4/1.3 |
| 56-4 | 0.2/0.65 |

Example 2

Particle Deposition and Binding Deposition

Figure 1A:
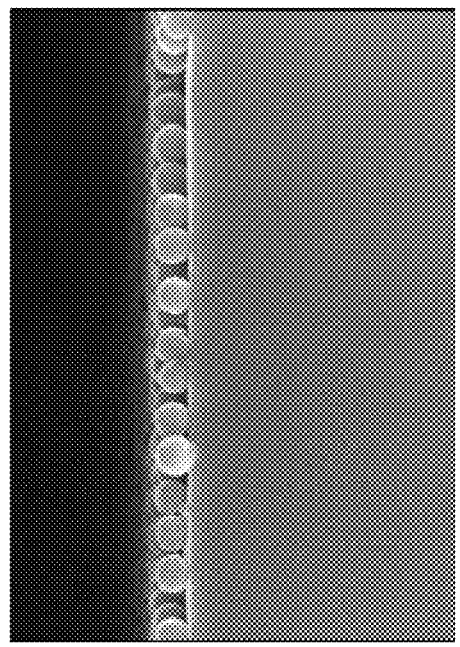

FIG. 4 shows the different weight percentages of alkali binders (formulations 5-2 to 5-5) used for 100-250 nm silica nanoparticle coated surfaces (e.g. IPA ST-ZL (70-100 nm) Nissan Chemical USA, 250 nm silica powder, Fiber optic center, ~120-150 nm silica dispersions in water from microspheres-nanospheres.com). The primary silica nanoparticle layer is typically dip/spin coated using 1-5% wt silica/water or IPA dispersions. Monolayer coatings are obtained by varying the concentration, withdrawal speed, and spin speed etc. After drying of the primary layer the binder is dip coated onto the surfaces. Binder thickness is varied using varying concentration and dip withdrawal speed and coating time. FIGS. 1A and 1B show SEMs of two different concentrations of binder dip coated at the same speed and FIG. 5 shows the corresponding data for these samples.

Example 3

Binder Heat Treatment

Then samples are by heat treatment at temperatures varying from 500° C. to 630° C. for 1 h. The surfaces are coated with capping layer using Dow Corning® DC2634 before durability measurement. The nanoparticle/binder coating should be oleophobic (>90°) and should remain oleophobic if the coating survives the wipe test. The goniometer used for contact angle measurements is known as a Drop shape analyzer DSA100, Kruss GmbH, Germany.

FIGS. 5 and 6 show the binder adhesion at 630° C./1 h and 530° C./0.5 h respectively followed by a capping layer with crockmeter (AATCC Crockmeter CM-5, SDL-Atlas) durability data more than 3000/5000 wipes using the microfiber cloth (382ZZ-100, Photodon.com).

FIG. 4 shows that both 100 nm and 250 nm particles tested with sodium silicate (NaSil) coatings (5-4 and 5-5 formulations at two speeds of dip coating) with a capping layer held up to testing when subjected to 3000 wipes durability measured by contact angle before and after the crockmeter swiping tests. The dipcoater used is from KSV NIMA (NIMA technology, UK) No apparent change in contact angle was seen. Formulations 5-2 and 5-3 result in thicker NaSil coatings on the silica nanoparticles that reduce the roughness of the coating and hence reduce the contact angle. Compressive stress ("CS") and depth of layer ("DOL") seem to be within reference sample values based on measurements of both coated and uncoated sides.

FIG. 6 compares 100 nm particles tested with a NaSil coating. Several formulations (5-4 and 5-5 formulations at 25 mm/min) with a capping layer showed promise with respect to 5000 wipes durability measured by contact angle before and after the crockmeter swiping tests. In these experiments, all samples were coated with a capping perfluoropolyethersilane capping layer prior to contact angle measurement. % Transmission and % Haze is measured using BYK Gardner Haze-guard plus.

Example 4

Compressive Stress and Depth of Layer

After nanoparticle and binder deposition and heat treatment, the samples are subjected to IOX procedure established for that specific glass composition. FIG. 4 shows CS and DOL data on coated and uncoated sides depicting the ion exchangeability of the nanoparticle/binder composition. The CS and DOL values are comparable to the reference 2318 that is ion exchanged using KNO$_3$ Example 5

Pencil Hardness Data

Figure 2B:
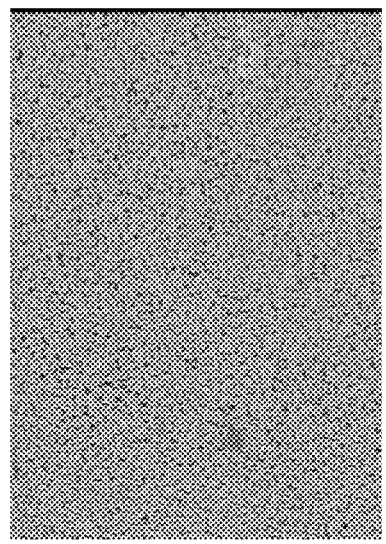
FIGS. 2A and 2B: Images of durability testing of an embodiment.
Figure 2A:
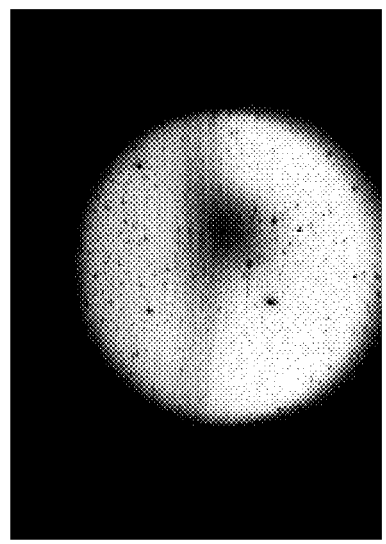
Figure 3B:
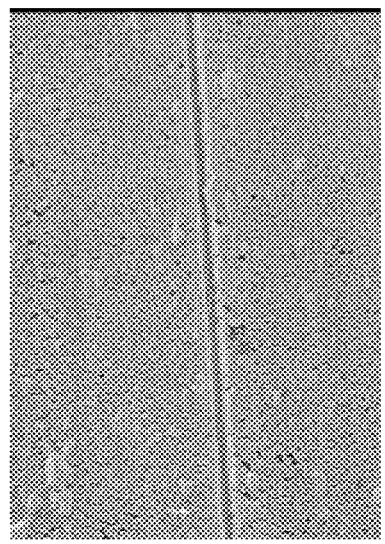
FIGS. 3A and 3B: Images of durability testing of an embodiment. The mark on the nanoparticle and binder coated structure was made by a graphite pencil with a hardness of 5H (FIG. 3A). The image in FIG. 3B shows that harder pencil was able to scratch the structure.
Figure 3A:
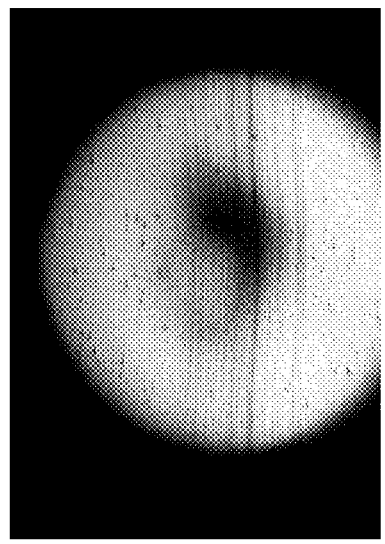

FIG. 7 lists the % Haze and Transmittance obtained from the HAZE-GARD PLUS® (BYK Additives and Instruments, Inc.) for different diameter nanoparticle/binder coatings. The NaSil binder used in this example is a different sodium silicate with the SiO$_2$/Na$_2$O ratio 3.2. The figures also list the scratch resistance data. Scratch resistance is measured using a Pencil Hardness Kit and typically scratch resistance increases as 5B<4B<3B< . . . B<HB<1H<2H . . . <9H. Scratch resistance is being improved by addition of thicker binder on the larger particle size so that it does not adversely affect the % transmission. FIGS. 2 and 3 show images where the pencil scratch testing was done. FIG. 2 is an image showing the use of 3B pencil (soft) where the graphite mark is transferred to the structure but with no evidence of a scratch and FIG. 3 shows an image with the 5H pencil were we see a distinct scratch mark.

Example 6

Dual Binder

Use of an alkali silicate binder with the capping layer of a perfluoropolyethersilane (e.g., Dow Corning® DC2634) on the nanoparticle surface seemed to considerably improve the pencil scratch data, as shown in FIG. 8. In this example the NaSil binder acted as a primer layer to the capping layer. Use of the alkali silicate alone resulted in scratches seen when using the "hb" hardness when measured on the nanoparticle layer pencil hardness test. However, the combination of an alkali silicate and the capping layer resulted in scratching at much higher hardnesses, with surfaces passing tests with pencil hardnesses of 8h. The organic binder used in such experiments may act like a capping layer, and may be cured more quickly with the addition of sodium in the primary layer. The method may be used either before or after ion exchange of the sample.

We claim:
1. A structure comprising:
 a. a support element;
 b. a nanoparticulate layer;
 c. a binder; and
 d. a capping layer disposed onto the binder and nanoparticulate layer;
 wherein the binder consists essentially of an inorganic network structure that comprises silicon dioxide and an alkali silicate, alkali borate, alkali phosphate or combinations thereof, wherein the network structure is a glass that is consolidated from about 300° C. to about 750° C.,
wherein the glass is ion-exchangeable, and
further wherein the nanoparticulate layer is embedded in the binder.

2. The structure of claim 1, wherein the ratio of silicon dioxide to alkali silicate, borate, or phosphate comprises a ratio from about 0.05:1 to about 20.0:1.

3. The structure of claim 2, wherein the binder consists essentially of an inorganic network structure that comprises silicon dioxide at a weight percent from about 0.1 to about 40.0 and an alkali silicate, alkali borate, alkali phosphate or combinations thereof.

4. The structure of claim 1, wherein the support element comprises a glass or glass ceramic.

5. The structure of claim 1, wherein the capping layer comprises a silicate, a siloxane, a silane or a silsesquioxane.

6. The structure of claim 1, wherein the nanoparticulate layer comprises nanoparticles comprising solid nanoparticles, quantum dots, fullerenes, nanotubes, nanofibers, nanowires, nanorods, nanoshells, or combinations thereof.

7. The structure of claim 6, wherein the nanoparticulate layer comprises from about a monolayer to a multilayer of nanoparticles.

8. The structure of claim 6, wherein the nanoparticulate layer comprises nanoparticles having an average diameter of about 10 nm to about 10,000 nm.

9. The structure of claim 1, wherein the nanoparticulate layer comprises nanoparticles comprising a glass, ceramic, glass ceramic, polymer, metal, metal oxide, metal sulfide, metal selenide, metal telluride, metal phosphate, inorganic composite, organic composite, inorganic/organic composite, silica, alumina, zirconia, titania, or combinations thereof.

10. The structure of claim 1, wherein the glass has been subjected to an ion exchange process, and further wherein the compressive stress of the glass is about equivalent to the compressive stress of the support element subjected to an ion exchange process.

11. The structure of claim 1, wherein the glass has been subjected to an ion exchange process, and further wherein the depth of layer of the glass is about equivalent to the depth of layer of the support element subjected to an ion exchange process.

12. A method of forming the structure of claim 1, comprising:
a) providing the support element;
b) forming the nanoparticulate layer on said support element;
c) forming the binder on said support element;
d) forming the capping layer; and
e) heating said support element comprising said nanoparticulate layer, said binder, and optionally, said capping layer, from about 300° C. to about 750° C. to form the binder into an inorganic network structure consisting essentially of the silicon dioxide and the alkali silicate, alkali borate, alkali phosphate, or combinations thereof,
wherein the network structure is consolidated as a glass during the heating, and
wherein the glass is ion-exchangeable, and
further wherein the nanoparticulate layer is embedded within the binder.

13. The method of claim 12, wherein the ratio of silicon dioxide to alkali silicate, borate, or phosphate comprises a ratio from about 0.05:1 to about 20.0:1.

14. The method of claim 13, wherein the binder consists essentially of an inorganic network structure that comprises silicon dioxide at a weight percent from about 0.1 to about 40.0 and an alkali silicate, alkali borate, alkali phosphate or combinations thereof.

15. The method of claim 12, wherein the support element comprises a glass or glass ceramic.

16. The method of claim 15, wherein the capping layer comprises a silicate, a siloxane, a silane or a silsesquioxane.

17. The method of claim 12, wherein forming the binder comprises dip coating, spin coating, slot coating, Langmuir-Blodgett deposition, electrospray ionization, direct nanoparticle deposition, vapor deposition, chemical deposition, vacuum filtration, flame spray, electrospray, spray deposition, electrodeposition, screen printing, close space sublimation, nano-imprint lithography, in situ growth, microwave assisted chemical vapor deposition, laser ablation, arc discharge or chemical etching.

18. The method of claim 12, wherein forming the nanoparticulate layer comprises dip coating, slot coating, spin coating, Langmuir-Blodgett deposition, electrospray ionization, direct nanoparticle deposition, vapor deposition, chemical deposition, vacuum filtration, flame spray, electrospray, spray deposition, electrodeposition, screen printing, close space sublimation, nano-imprint lithography, in situ growth, microwave assisted chemical vapor deposition, laser ablation, arc discharge or chemical etching.

19. The method of claim 12, wherein the nanoparticulate layer comprises nanoparticles comprising solid nanoparticles, quantum dots, fullerenes, nanotubes, nanofibers, nanowires, nanorods, nanoshells, or combinations thereof.

20. The method of claim 19, wherein the nanoparticulate layer comprises from about a monolayer to a multilayer of nanoparticles.

21. The method of claim 19, wherein the nanoparticulate layer comprises nanoparticles having an average diameter of about 10 nm to about 10,000 nm.

22. The method of claim 12, wherein the nanoparticulate layer comprises nanoparticles comprising a glass, ceramic, glass ceramic, polymer, metal, metal oxide, metal sulfide, metal selenide, metal telluride, metal phosphate, inorganic composite, organic composite, inorganic/organic composite, or silica, alumina, zirconia, titania, or combinations thereof.

23. The method of claim 12, further comprising subjecting the structure to an ion exchange process.

24. A structure comprising:
a. a support element;
b. a nanoparticulate layer comprising a glass or glass ceramic;
c. a binder consisting essentially of a network structure, the network structure comprising silicon dioxide and an alkali silicate, alkali borate, alkali phosphate or combinations thereof; and
d. a capping layer disposed on the binder and nanoparticulate layer,
wherein the network structure is a glass that is consolidated from about 300° C. to about 750° C.,
wherein the glass is ion-exchangeable, and
further wherein the nanoparticulate layer is embedded in the binder.

25. The structure of claim 24, wherein the binder thickness is less than the average diameter of a feature of said nanoparticulate layer.

26. The structure of claim 24, wherein the nanoparticulate layer further comprises silica, alumina, titania or zirconia.

27. The structure of claim 26, wherein the binder thickness is less than the average diameter of a feature of said nanoparticulate layer.

* * * * *